3,155,586
STABLE LIQUID PREPARATIONS OF 6-DEMETHYLTETRACYCLINES

Charles C. Reed, Trenton, Robert B. Fortenbaugh, Gladstone, and Lewis J. Leeson, Park Ridge, N.J., assignors to American Cyanamid Company, Stamford, Conn., a corporation of Maine
No Drawing. Filed Jan. 23, 1963, Ser. No. 253,284
13 Claims. (Cl. 167—65)

This invention is concerned with novel liquid antibiotic compositions adapted for pharmaceutical use. More particularly, the invention is concerned with solutions adapted for oral, parenteral and topical use of certain tetracycline antibiotics which may be represented by the following general formula:

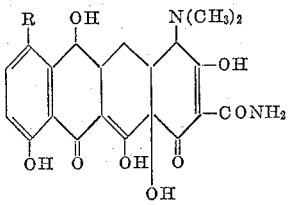

wherein R is hydrogen or chlorine. The solutions are remarkably stable at certain hydrogen ion concentrations and are comprised of the antibiotic and a magnesium salt dissolved in a polyhydric alcohol vehicle having an apparent pH of 1.5 to 5.0. The term apparent pH, as used in this specification, shall mean that pH reading obtained from substantially non-aqueous solutions such as those of the present invention, using glass and calomel electrodes.

It is well known that aqueous solutions of 6-demethyltetracycline and 7-chloro-6-demethyltetracycline are unstable. On the alkaline side, the corresponding isotetracycline forms while on the acid side, the anhydrotetracycline is produced. At an approximately neutral pH, epimerization occurs. Hence, aqueous formulations of 6-demethyltetracycline and 7-chloro-6-demethyltetracycline are stable for only short periods of time and, therefore, these antibiotics have been marketed heretofore either in the form of a suspension or in a solid form for reconstitution prior to use. While such modes of administration are adequate, they are quite inconvenient and, in addition, use under adverse circumstances provides opportunity for contamination as well as for error. Since stable solutions of 6-demethyltetracycline and 7-chloro-6-demethyltetracycline are highly desirable for use in human and veterinary medicine, solutions of these antibiotics in various vehicles have been suggested in the past but none has been satisfactory from the standpoint of shelf stability in the acid pH range.

We have found that solutions containing a substantial proportion (from about 70% to about 98% by weight) of a physiologically acceptable polyhydric alcohol as vehicle provide remarkably stable 6-demethyltetracycline and 7-chloro-6-demethyltetracycline solutions having relatively high concentrations of antibiotic when a certain proportion of a magnesium salt and an apparent pH of from 1.5 to 5.0 are employed. It is thought that this remarkable stability advantage over other solutions is possibly due to the formation of an antibiotic-magnesium complex. This complex is thought to have the composition of from 1 to 6 moles of magnesium salt per mole of 6-demethyltetracycline or 7-chloro-6-demethyltetracycline. Thus, the molar ratio of magnesium salt to antibiotic may be 1:1, 2:1, 5:2, 3:1, 7:2, 4:1, 5:1, 6:1, etc., although the range of molar ratios of from about 2:1 to about 4:1 is preferred. Where stability for oral or topical use is desired, then a molar ratio of magnesium salt to antibiotic of about 2:1 is preferred. Where high blood levels for parenteral use is desired, then a molar ratio of magnesium salt to antibiotic of about 4:1 is preferred.

Anions other than the chloride, that is, salts other than magnesium chloride, for example, may be employed. It is only necessary that the salt provide a clear solution and that, of course, the anion be physiologically acceptable, compatible in solution with the 6-demethyltetracycline or 7-chloro-6-demethyltetracycline, and stable at the pH of the composition. Satisfactory results are achieved by substituting the acetate, lactate, etc. for the chloride. By appropriate adjustment of the vehicle concentration, apparent pH, and magnesium salt-antibiotic ratio, the corresponding acetate, lactate, etc. salts may be substituted for magnesium chloride. It is indeed surprising that other cations, such as calcium and zinc for example, are inoperative in the novel compositions of the present invention.

The pH of the solutions of the present invention may require adjusting subsequent to preparation to achieve the desired pH. Under such circumstances the preferred organic bases for the purposes of adjusting the pH of the solutions of the present invention are the β-aminoalkanols such as monoethanolamine and diethanolamine. However, other organic bases such as ethylenediamine, piperazine, morpholine, diethylamine, 1-amino-propanol-2, 1-amino-propanol-3 and diisopropanolamine may also be satisfactorily employed. Inorganic bases such as sodium hydroxide and potassium hydroxide may also be satisfactorily employed. The amount of base employed in adjusting the pH is an amount sufficient to adjust the apparent pH of the solution to a value of from 1.5 to 5.0, and preferably within the range of 3.0 to 5.0.

The solvents which have been discovered to be most useful in the practice of the present invention are the polyhydric aliphatic alcohols and mixtures thereof. Especially satisfactory are glycerine, propylene glycol, polyethylene glycols and mixtures thereof. The polyethylene glycols contemplated in the practice of the present invention consist of a mixture of non-volatile, normally liquid, polyethylene glycols which are soluble in both water and organic liquids and which have molecular weights of from about 200 to about 600. Such mixtures are usually obtained by condensing glycol with ethylene oxide. Although various mixtures of the aforementioned non-volatile polyethylene glycols may be employed, it is preferred to use a mixture of non-volatile polyethylene glycols having an average molecular weight of from about 200 to about 400.

One of the difficulties encountered with liquid compositions of 6-demethyltetracycline or 7-chloro-6-demethyltetracycline is discoloration and loss of potency which appears to be due in part to oxidative degradation. This problem is particularly aggravated with aqueous solutions, but is also occasionally encountered with non-aqueous solutions. In order to avoid this difficulty, oxidizing conditions must be avoided during storage of the present products. As a practical matter it is convenient to employ antioxidants in addition to storing the product in an inert atmosphere. Satisfactory antioxidants are those which are physiologically acceptable for use in parenteral drug products and those which are, of course, compatible with 6-demethyltetracycline or 7-chloro-6-demethyltetracycline. Examples of suitable antioxidants include sodium bisulfite, sodium metabisulfite, monothioglycerol and combinations thereof. Generally, from about 0.05% to about 0.5% concentrations of antioxidant are employed.

The novel compositions of the present invention are prepared by mixing 6-demethyltetracycline or 7-chloro-6-demethyltetracycline, preferably in the amphoteric form but alternatively as an acid-addition salt, and the magnesium salt in the polyhydric alcohol of approximately one-half of the final volume of vehicle to be employed. The apparent pH of the mixture is then adjusted to about 3.5 with a base as set forth above. The pH of the final composition is critical and the apparent pH must be within the range of from about 1.5 to about 5.0. The finished composition is obtained by then adding the remainder of the vehicle and the solution is sterilized, for instance, by filtration as a final stage of manufacture.

The use of an acid-addition salt of the antibiotic such as the hydrochloride, the phosphate, the nitrate, etc. in preparing the present compositions is satisfactory. However, they require a larger amount of neutralizing agent with the accompanying formation of a larger quantity of the by-product acid-addition salt of the neutralizing agent. This excess material performs no physiological function and, therefore, it is preferred to use the amphoteric antibiotic and keep the total concentration of the salts in the solution to a minimum.

The preferred concentration of 6-demethyltetracycline or 7-chloro-6-demethyltetracycline is 10 to 125 mg./ml. of the finished compositions when intramuscular injection is the purpose for which the compositions are intended. However, they are equally adapted to intravenous administration when diluted with water or diluents employed in intravenous therapy in appropriate quantities. For this use, initial concentrations down to about 10 to 50 mg./ml. of the antibiotic are satisfactory. Such compositions are also useful for general oral and topical preparations.

Other ingredients commonly employed in pharmaceutical formulations may also be incorporated in the novel liquid antibiotic compositions of the present invention. Examples of these are urea, steroid hormones like prednisolone and triamcinolone, local anesthetics such as procaine and xylocaine, niacinamide, ascorbic acid, and up to 20% by weight of water.

The novel antibiotic-magnesium salt solutions of the present invention are particularly advantageous because of their remarkable stability over long periods of time. Their value extends not only to humans but also to the treatment of cattle, sheep, goats, hogs, horses, poultry, house pets and other animals. Compared to the antibiotic solutions heretofore available, their stability and shelf life are outstanding. They are not subject to deterioration, hence their potency remains essentially constant. The dosage of the present compositions is adjusted to provide about 2 mg. to about 10 mg. of antibiotic activity per day per kilogram of body weight. Similar or reduced doses may be employed in the treatment of small animals. Intramuscular injections are generally administered in a volume of from 1 to 4 ml. Thus the entire daily dose can be administered in one or two injections.

The following examples are provided for illustrative purposes and may include particular features of the invention. However, the examples should not be construed as limiting the invention, many variations of which are possible without departing from the spirit or scope thereof.

EXAMPLE 1

In 40 ml. of hot (60°–70° C.) propylene glycol was dissolved 2.22 g. of magnesium chloride. After cooling the resulting solution to approximately 50° C., 60 mg. of sodium bisulfite was added, with stirring, until solution was effected. After cooling the resulting solution to approximately 35° C., 2.95 g. of 6-demethyltetracycline was dissolved therein with mixing. The volume was adjusted to about 55 ml. with propylene glycol, and the apparent pH of the solution was adjusted to a value of 3.9 by the addition of about 0.3 ml. of monoethanolamine. The resulting solution was diluted to 60 ml. with propylene glycol and sufficient monoethanolamine to bring the final pH to an apparent value of 4.0. The initial assay of this preparation was 52.7 mg./ml. of antibiotic. A stability study was carried out with this preparation and the results are set forth in Table I below.

Table I

| Elapsed Time | Temp., °C. | Assay, mg./ml. | Percent of Initial Assay |
| --- | --- | --- | --- |
| 8 weeks | 25 | 52.2 | 99 |
| 6 months | 25 | 50.6 | 96 |
| 4 weeks | 42 | 48.0 | 91 |
| 8 weeks | 42 | 44.4 | 84 |

EXAMPLE 2

The procedure of Example 1 was repeated but employing only sufficient monoethanolamine to bring the final pH to an apparent value of 3.5. The initial assay of this preparation was 56.6 mg./ml. of antibiotic. A stability study was carried out with this preparation and the results are set forth in Table II below.

Table II

| Elapsed Time | Temp., °C. | Assay, mg./ml. | Percent of Initial Assay |
| --- | --- | --- | --- |
| 8 weeks | 25 | 54.2 | 96 |
| 6 months | 25 | 56.2 | 99 |
| 4 weeks | 42 | 47.9 | 85 |
| 8 weeks | 42 | 43.4 | 77 |

EXAMPLE 3

The procedure of Example 1 was repeated but employing sufficient monoethanolamine to bring the final pH to an apparent value of 5.0. The initial assay of this preparation was 53.0 mg./ml. of antibiotic. A stability study was carried out with this preparation and the results are set forth in Table III below.

Table III

| Elapsed Time | Temp., °C. | Assay, mg./ml. | Percent of Initial Assay |
| --- | --- | --- | --- |
| 8 weeks | 25 | 49.4 | 93 |
| 6 months | 25 | 52.4 | 99 |
| 4 weeks | 42 | 39.7 | 75 |
| 8 weeks | 42 | 35.2 | 67 |

EXAMPLE 4

In 60 ml. of hot (60°–70° C.) propylene glycol was dissolved 7.53 g. of magnesium chloride. After cooling the resulting solution to approximately 50° C., 0.1 g. of sodium formaldehyde sulfoxylate and 2.0 g. of Versacaine hydrochloride were added, with stirring, until solution was effected. After cooling the resulting solution to approximately 35° C., 5.0 g. of 6-demethyltetracycline was dissolved therein with mixing. The volume was adjusted to about 90 ml. with propylene glycol, and the apparent pH of the solution was adjusted to a value of 3.9 by the addition of about 1.0 ml. of monoethanolamine. The resulting solution was diluted to 100 ml. with propylene glycol and sufficient monoethanolamine to bring the final pH to an apparent value of 4.0. The initial assay of this preparation was 52.8 mg./ml. of antibiotic. A stability study was carried out with this preparation and the results are set forth in Table IV below.

Table IV

| Elapsed Time | Temp., °C. | Assay, mg./ml. | Percent of Initial Assay |
|---|---|---|---|
| 4 weeks | 25 | 52.1 | 99 |
| 8 weeks | 25 | 53.0 | 100 |
| 4 weeks | 42 | 47.5 | 90 |
| 8 weeks | 42 | 43.1 | 82 |

EXAMPLE 5

The procedure of Example 4 was repeated but substituting a 2% solution of potassium hydroxide in propylene glycol for the monoethanolamine. The initial assay of this preparation was 53.2 mg./ml. of antibiotic. A stability study was carried out with this preparation and the results are set forth in Table V below.

Table V

| Elapsed Time | Temp., °C. | Assay, mg./ml. | Percent of Initial Assay |
|---|---|---|---|
| 8 weeks | 25 | 53.4 | 100 |
| 4 weeks | 42 | 46.4 | 87 |
| 8 weeks | 42 | 44.5 | 82 |

EXAMPLE 6

In 3.9 ml. of water was dissolved 30 mg. of sodium formaldehyde sulfoxylate and 650 mg. of magnesium chloride. The resulting solution was added to 33.1 g. of polyethylene glycol 400, and 0.85 g. of 6-demethyltetracycline was dissolved therein with mixing. The apparent pH was adjusted to a value of 4.0 with monoethanolamine, and the solution was added to a mixture of 66 g. of polyethylene glycol 1540 and 94 g. of polyethylene glycol 6000 which had been previously melted and held at 65° C. Suppositories were prepared by pouring the melted mixture into a mold. The average weight was 3.38 g. per suppository and the initial assay was 7.52 mg./g. of antibiotic. A stability study was carried out with these suppositories and the results are set forth in Table VI below.

Table VI

| Elapsed Time | Temp., °C. | Assay, mg./g. | Percent of Initial Assay |
|---|---|---|---|
| 6 weeks | 25 | 7.78 | 103 |
| 8 weeks | 25 | 7.62 | 101 |
| 16 weeks | 25 | 7.54 | 100 |

EXAMPLE 7

The procedure of Example 1 was repeated but substituting 3.50 g. of magnesium lactate for the magnesium chloride of that example. Also, diethanolamine was substituted for the monoethanolamine of that example to bring the apparent pH of the solution to a value of 3.75. The initial assay of this preparation was 52.7 mg./ml. of antibiotic. A stability study was carried out with this preparation and the results are set forth in Table VII below.

Table VII

| Elapsed Time | Temp., °C. | Assay, mg./ml. | Percent of Initial Assay |
|---|---|---|---|
| 8 weeks | 25 | 54.0 | 102 |
| 6 months | 25 | 55.2 | 105 |
| 4 weeks | 42 | 46.4 | 86 |
| 8 weeks | 42 | 45.8 | 85 |

EXAMPLE 8

A suspension of 1067 mg. of $MgCl_2 \cdot 4H_2O$ in 40 ml. of propylene glycol was heated to 80° C. The resulting clear solution was cooled to 25° C. and 1.25 g. of 7-chloro-6-demthyltetracycline was added, with stirring. After filtering through a sintered glass funnel, there was obtained a clear amber solution having an apparent pH of 3.6. The initial assay of this preparation was 29.0 mg./ml. of antibiotic. After 4 weeks at 56° C., the assay was 24.5 mg./ml., representing a loss in potency of only 12.5% from the initial assay. After 2 years at room temperature, the assay was 24.8 mg./ml., representing a loss in potency of only 11%.

EXAMPLE 9

The procedure of Example 8 was repeated but substituting polyethylene glycol 400 for the propylene glycol of that example. There was obtained a clear amber solution having an apparent pH of 4.1. The initial assay of this preparation was 29.0 mg./ml. of antibiotic. After 18 months at room temperature, the assay was 25.5 mg./ml., representing a loss in potency of only 12% from the initial assay.

EXAMPLE 10

The procedure of Example 8 was repeated but employing 1.62 g. of $MgCl_2 \cdot 4H_2O$. There was obtained a clear amber solution having an apparent pH of 2.2. The initial assay of this preparation was 27.0 mg./ml. of antibiotic. After 4 weeks at 56° C., the assay was 24.8 mg./ml., representing a loss in potency of only 8% from the initial assay.

EXAMPLE 11

In 80 ml. of glycerine was dissolved 2.134 g. of $MgCl_2 \cdot 4H_2O$ and 2.5 g. of 7-chloro-6-demethyltetracycline. There was obtained a clear amber solution having an apparent pH of 3.9. The initial assay of this preparation was 28.3 mg./ml. of antibiotic. After 4 weeks at 56° C., the assay was 24.0 mg./ml., representing a loss in potency of only 15% from the initial assay. After one year at room temperature, the assay was 26.5 mg./ml., representing a loss in potency of only 6%.

EXAMPLE 12

In sufficient propylene glycol to make 20 ml. of solution was dissolved 1.0 g. of 6-demethyltetracycline, 0.76 g. of magnesium chloride, 400 mg. of procaine hydrochloride, 20 mg. of sodium bisulfite, and sufficient monoethanolamine to adjust the apparent pH of the solution to a value of 4.0. A group of four rabbits (Group I) were each injected intramuscularly with this preparation at an antibiotic level of 5 mg./kg. of body weight, and heart bled at 1, 4 and 7 hours after injection. The blood serum of each rabbit was assayed microbiologically after withdrawal using a pad-plate method with Bacillus cereus, and the results are expressed in tetracycline hydrochloride equivalents in Table I below in mcg./ml. of blood serum.

In sufficient propylene glycol to make 20 ml. of solution was dissolved 1.0 g. of 6-demethyltetracycline, 1.52 g. of magnesium chloride, 400 mg. of procaine hydrochloride, 20 mg. of sodium bisulfite, and sufficient monoethanolamine to adjust the apparent pH of the solution to a value of 4.0. A group of four rabbits (Group II) were each injected intramuscularly with this preparation at an antibiotic level of 5 mg./kg. of body weight, and heart bled at 1, 4 and 7 hours after injection. The blood serum of each rabbit was assayed microbiologically after withdrawal using the pad-plate method with Bacillus cereus, and the results are expressed in tetracycline hydrochloride equivalents in Table I below in mcg./ml. of blood serum.

A control group of four rabbits (Group III) were each injected intramuscularly with a standard tetracycline hydrochloride formulation at an antibiotic level of 5 mg./kg. of body weight, and heart bled at 1, 4 and 7 hours after injection. The blood serum of each rabbit was assayed microbiologically after withdrawal using the pad-plate method with *Bacillus cereus*, and the results are expressed in Table I below in mcg. of tetracycline hydrochloride/ml. of blood serum.

*Table I*

| Group of Rabbits | Hours After Injection | | |
|---|---|---|---|
| I | 1.00 0.96 1.16 1.10 | 0.95 0.87 1.12 0.96 | 0.81 0.75 0.72 0.81 |
| II | 1.22 1.32 1.40 1.40 | 1.17 1.17 1.15 0.99 | 0.96 0.90 0.84 0.78 |
| III | 1.36 1.26 1.44 1.72 | 0.75 0.71 0.71 0.93 | 0.39 0.34 0.33 0.59 |

The above data shows that a 4:1 molar ratio of magnesium to antibiotic gives superior blood levels as compared to a 2:1 molar ratio of magnesium to antibiotic. The above data also shows that the novel compositions of the present invention give superior blood levels over a prolonged period of time as compared to the tetracycline hydrochloride standard formulation.

EXAMPLE 13

This example demonstrates that tetracycline and oxytetracycline are unstable with regard to potency under acid conditions, and that demethyltetracycline and 7-chloro-6-demethyltetracycline are stable with regard to potency under similar conditions.

Compositions containing the following ingredients were prepared:

FORMULATION A

Tetracycline _____ mg__ 500
Magnesium chloride·4H₂O _____ mg__ 360
Sodium formaldehyde sulfoxylate_____ mg__ 10
Distilled water _____ ml__ 1
Ethanolamine to pH ca. 4.
Propylene glycol, q.s. ad, 10 ml.

FORMULATION B

Demethyltetracycline _____ mg__ 500
Magnesium chloride·4H₂O _____ mg__ 360
Sodium formaldehyde sulfoxylate_____ mg__ 10
Distilled water _____ ml__ 1
Ethanolamine to pH ca. 4.
Propylene glycol, q.s. ad, 10 ml.

Samples of each of the above formula were stored at room temperature and at 42° C. and tested for antibiotic potency by microbiological assay at various times during storage. The results are tabulated below:

*Stability Data*

| | Room Temp., Percent of Initial Antibiotic Potency | | | | 42° C., Percent of Initial Antibiotic Potency | | | |
|---|---|---|---|---|---|---|---|---|
| | 2 weeks | 4 weeks | 8 weeks | 26 weeks | 2 weeks | 4 weeks | 8 weeks | 26 weeks |
| Tetracycline | 88 | 79 | 79 | 53 | 39 | <15 | <15 | <15 |
| Demethyltetracycline | 101 | 100 | 100 | 89 | 96 | 87 | 70 | 58 |

The aforementioned procedure was again followed using the same formulations but substituting for tetracycline, oxytetracycline; and substituting for demethyltetracycline, 7-chloro-6-demethyltetracycline. Samples of each of the formulations were subjected to accelerated stability studies.

The samples were maintained at 56° C. for four weeks and were tested for antibiotic potency by microbiological assay. The tests resulted in ascertaining that the formulation containing the oxytetracycline retained 41% of its initial potency, whereas, the formulation containing 7-chloro-6-demethyltetracycline retained 83.5% of its initial potency.

This application is a continuation-in-part of our copending application, Serial No. 192,351, filed May 4, 1962, now abandoned.

What is claimed is:

1. A stable liquid antibiotic composition adapted for pharmaceutical use comprising, as vehicle, a physiologically acceptable polyhydric alcohol and dissolved in said vehicle from 10 to 125 mg./ml. of a substance selected from the group consisting of 6-demethyltetracycline, 7-chloro-6-demethyltetracycline, and the non-toxic acid-addition salts thereof, from one to six molar equivalents of a water soluble, physiologically acceptable salt of magnesium per mole of antibiotic, and having an apparent pH of 1.5 to 5.0.

2. A composition according to claim 1 wherein the polyhydric alcohol is propylene glycol.

3. A composition according to claim 1 wherein the polyhydric alcohol is polyethylene glycol.

4. A composition according to claim 1 wherein the polyhydric alcohol is glycerine.

5. A composition according to claim 1 wherein the salt is magnesium lactate.

6. A composition according to claim 1 wherein the salt is magnesium chloride.

7. A composition according to claim 1 containing a physiologically acceptable base.

8. A composition according to claim 7 wherein the base is monoethanolamine.

9. A composition according to claim 7 wherein the base is 2,2'-iminodiethanol.

10. A composition according to claim 7 wherein the base is sodium hydroxide.

11. A composition according to claim 7 wherein the base is potassium hydroxide.

12. A composition according to claim 1 having dissolved therein up to 20% by weight of water.

13. A composition according to claim 1 having dissolved therein from about 2% to about 10% by weight of water.

References Cited in the file of this patent

UNITED STATES PATENTS

| 2,878,289 | McCormick et al. | Mar. 17, 1959 |
| 2,903,395 | Salivar | Sept. 8, 1959 |
| 2,976,213 | Murphey | Mar. 21, 1961 |
| 2,984,686 | Blackwood et al. | May 16, 1961 |
| 3,005,754 | Granatek | Oct. 24, 1961 |
| 3,009,956 | Noseworthy et al. | Nov. 21, 1961 |
| 3,017,323 | Gordon et al. | Jan. 16, 1962 |
| 3,026,248 | Noseworthy et al. | Mar. 20, 1962 |
| 3,043,875 | Beereboom et al. | July 10, 1962 |
| 3,053,892 | Sieger et al. | Sept. 11, 1962 |
| 3,068,264 | Sieger et al. | Dec. 11, 1962 |